Patented Dec. 24, 1935

2,025,612

UNITED STATES PATENT OFFICE 2,025,612

RESINOUS COMPOSITION AND PROCESS FOR MAKING THE SAME

Ernest A. Rodman, Marshallton, Del., assignor to E. I. du Pont de Nemours & Company, Wilmington, Del., a corporation of Delaware No Drawing. Application April 16, 1932, Serial No. 605,800

9 Claims. (Cl. 260—8)

This invention relates to resinous materials, and more particularly to new resins modified with ester waxes and to coating compositions containing these resins.

Various esters and wax-like products have been used to modify polyhydric alcohol-polybasic acid resins, but insofar as I am aware the improved resins which result from the incorporation of the ester waxes in accordance with the present invention have not been disclosed hitherto. The term "ester wax", as used herein, refers to substances of animal, vegetable or synthetic origin, consisting of or containing the higher fatty acid esters of monohydric alcohols, which are more or less unctuous, fusible, variably viscous to solid substances, having a characteristic "waxy" luster, which are insoluble in water but usually soluble in carbon disulfide, benzol, etc., and which are extremely susceptible to changes in temperature and whose origin, composition and color are variable. Such waxes are carnauba, montan, spermaceti, beeswax, and lauryl stearate. I desire it to be understood that "ester wax" as herein defined does not include the class of waxy bodies having the physical characteristics just mentioned, consisting entirely of the higher fatty acid esters of polyhydric alcohols, such as glycerides which have a "waxy" appearance, for example tripalmitin and tristearin; such waxy materials, which are esters of polyhydric alcohols, are related to the fatty oils, which have been proposed heretofore as modifying agents for polyhydric alcohol-polybasic acid resins. The conventional methods for their incorporation into the resin are not suitable for incorporating my ester waxes, which consist of or contain higher fatty acid esters of monohydric alcohols. Hydrocarbon waxes such as paraffin, ceresin, ozocerite, and the like are relatively inert chemically and cannot be incorporated into polyhydric alcohol-polybasic acid resins by the methods given hereinafter; these are likewise excluded by the term ester wax.

This invention has as an object the production of new resins. A further object is a process for making these resins. A still further object resides in the production of improved resinous compositions.

I desire it to be understood that in the present invention the wax forms an integral part of the resin and is not simply a mixture of the wax with the resin. The ester wax cannot be extracted as such from the wax modified resin made by the present methods, nor can a homogeneous product be obtained by fusing together the preformed resin and the wax.

My preferred method of incorporating these ester waxes into the resin consists in heating the wax with a part or all of the polyhydric alcohol in the presence of a suitable alcoholysis catalyst such as litharge or sodium hydroxide. The product so obtained is then treated with the polybasic acid, the remainder of the polyhydric alcohol, if any, and the other resin ingredients, if any. Other resin ingredients, particularly fatty oil acids and natural resins, can frequently be included to advantage in the first step. In order to avoid loss of polyhydric alcohol, it is preferred to carry out this step in a vessel fitted with a short air-cooled reflux condenser, which will at the same time permit water vapor to escape; this vessel also carries stirring and temperature-measuring devices. A desirable heat schedule for alcoholyzing the ester wax is one hour up to 250° C. and four hours at 250° C. This is a more drastic heat treatment than is necessary for the alcoholysis of various esters used heretofore as modifying agents for alkyl resins, for example, stearin and linseed oil. The polybasic acid, together with any polyhydric alcohol and other resin ingredients which remain, may be conveniently added to the alcoholized wax in the same vessel in which the latter is prepared. Heating and stirring is then continued until the finished product is obtained. Heat schedules for this second step usually range from 2–10 hours at 200–250° C., exact values depending on the nature and amount of the wax to be incorporated. As catalysts for the alcoholysis step, I prefer to use alkalies such as sodium hydroxide, calcium oxide, or basic lead compounds such as litharge, in quantities ranging from 0.05–0.5% by weight of the wax. In some cases, smaller quantities of the catalyst will suffice.

Various modifying agents known to be useful in the manufacture of resins of this type may be incorporated by the usual methods inasmuch as the character of the resin reaction (esterification) is not materially affected by the presence of the wax as an ingredient.

For a more detailed description of the method of carrying out my invention, reference may be had to the following examples in which parts are by weight:

*Example I*

Eighteen parts glycerol, 234.9 parts crude montan wax, and 0.12 part sodium hydroxide (0.05% on basis of wax) are heated together in a vessel fitted with a stirrer, thermometer, and air-cooled reflux condenser. The temperature is carried to 250° C. over a period of one hour, then maintained at this point for an additional 3 hours. In general it is necessary to heat for an extended period at a high temperature to carry the alcoholysis to such a stage that the final resin made from the alcoholized wax shall be homogeneous. Forty-seven and one-tenth parts phthalic anhydride is now added, the temperature dropping to about 210° C. Heat is again applied and the mixture held at 250° C. for two hours. A dark, homogeneous resin, soluble in acetone, toluol, and alcohol-hydrocarbon mixtures, is obtained. An accurate acid number cannot be obtained by ordinary methods because of the dark color. Where a light-colored product is desired, it is recommended that a refined grade of wax be used, as in Example III.

Example II

Forty-one and nine-tenths parts glycerol, 96.6 parts spermaceti, 77.1 parts rosin and 0.48 part sodium hydroxide (0.5% on the basis of wax) are placed in the apparatus of Example I and brought to 250° C. over a period of one-half hour, this temperature then being maintained for 2 hours. This assures sufficient alcoholysis for the subsequent formation of a homogeneous resin. Eighty-four and three-tenths parts phthalic anhydride is now added and the mixture carried to 250° C. over a period of three-quarters hour, this temperature then being maintained for six hours. During the last two hours, the molten mass is blown slowly with carbon dioxide. Acid number 12.

Example III

Ninety-four and six-tenths parts linseed oil acids, 69.2 parts refined montan wax, 49.1 parts glycerol, and 0.035 part sodium hydroxide (0.05% on basis of wax) are heated together in the usual apparatus. The temperature is brought to 250° C. over a period of one hour, and held at this point for four hours. The heat is removed, and 87.1 parts phthalic anhydride is added cautiously in small quantities. The temperature drops to about 200° C., and the mass foams. Heating and stirring are now continued at 225° C. for 6 hours. Acid number about 15.

Other suitable natural waxes in addition to the montan wax and spermaceti of the examples are such natural products as beeswax, carnauba wax, pisang wax, sperm oil, flax wax, wool wax, palm wax, gondang wax, psylla wax, rhimba wax, sugar cane wax, and Chinese ("insect") wax. Synthetic waxes such as lauryl stearate, cetyl palmitate, and melissyl pelargonate, etc., are also suitable for the practice of the present invention.

It should be pointed out that the natural waxes which I use in making my new resins may contain appreciable quantities of extraneous products, such as glycerides, hydrocarbons, and free monohydric alcohols and higher fatty acids, in addition to the higher fatty acid ester of the aliphatic monohydric alcohol. Available analytical data on the exact composition of the majority of these waxes is vague and inconsistent; nevertheless, generalizations which can be made as to composition indicate that these other materials frequently constitute a major percentage of a number of the natural waxes which I have found suitable for my invention and have termed "ester waxes". It is a matter of great interest that the apparently small percentages of the higher fatty acid esters of aliphatic monohydric alcohols should cause the resins to have their unusual properties and the waxes to have a chemical reactivity which is markedly different from that of pure glycerides and fatty oils. It may be, however, that the percentage of the aforesaid esters in the natural waxes is greater than is generally realized. It is not reasonable, for example, to suppose that plant and animal degradation products should be largely hydrocarbons; oxygen-containing products such as acids, alcohols and esters are more likely present. Published data on the composition of natural waxes is further misleading in that analytical methods employed generally involve saponification, the resulting free acids and alcohols usually being given as "constituents" of the wax whereas they are quite probably present initially as esters. I have observed that crude montan wax is more readily incorporated into polyhydric alcohol-polybasic acid resins than is the purified wax. It is possible, therefore, in addition, that crude or drastic purification methods destroy or transform the oxygen-containing materials of the natural wax into substances which cannot be alcoholized or are very difficult to alcoholize, and whose formation lowers the percentage of higher fatty acid ester of a monohydric alcohol which was present in the raw natural product. However, regardless of whether the percentage of these requisite esters is higher than it is generally supposed to be, or whether the presence of relatively small amounts of these requisite esters unexpectedly renders them different in chemical reactivity from pure glycerides or fatty oils, the fact remains that the presence of a certain amount of these monohydric alcohol esters renders these waxes distinguishable as a class and in the nature of the modified polyhydric alcohol-polybasic acid resins which they form, and necessitates the use of the drastic alcoholysis methods given hereinbefore. There seems to be little doubt however that the greater the ratio of hydrocarbon to monohydric alcohol ester the more difficult it is to incorporate the wax into the resin. For example, in the case of candelilla wax, which is generally supposed to contain a large amount of hydrocarbon and very little if any monohydric alcohol ester, I have met with only indifferent success in incorporating it into polyhydric alcohol-polybasic acid resins.

The polyhydric alcohols and polybasic acids commonly used in the manufacture of resins of the polyhydric alcohol-polybasic acid type may also be used for making my new resins modified with ester waxes. In addition to glycerol, other polyhydric alcohols such as the following may be used: ethylene glycol and higher homologs such as propylene glycol; diethylene glycol and higher polyglycols; polyglycerols; triethanolamine; sorbitol; pentaerythritol; dipentaerythritol; monoalkyl and aryl ethers of glycerol; sorbitol, etc.

Similarly, the following acids or anhydrides may replace phthalic anhydride in the manufacture of these resins; succinic; adipic; sebacic; chlorophthalic; diphenic; quinolinic; naphthalic; maleic; itaconic, hexahydrophthalic; tartaric; citric; dilactylic; salicyl-acetic; thio-dilactylic; tricarballylic; pyromellitic, etc.

Modifying agents for my new resins, in addition to the ester wax, include rosin and other natural resins and resin acids; fatty oil acids such as linseed oil acids as well as other drying and non-drying fatty acids such as China-wood, cottonseed, and castor oil acids; other monobasic acids such as butyric, oleic, stearic, benzoic, and salicylic acids; monohydric alcohols, such as n-butyl alcohol; ester gums; and fatty oils such as linseed or castor oil. When incorporating the fatty oils into the resins, it is preferable first to heat the oil and polyhydric alcohol together in the presence of an alcoholysis catalyst; this is not generally necessary with castor oil, however. It is generally preferred to carry out this alcoholysis of fatty oils separately from the alcoholysis of the ester wax, inasmuch as the optimum time and temperatures for each are different. However, where only a small amount of oil is to be incorporated into the resin, the ester wax, oil, and polyhydric alcohol may all be heated together if desired. As the alcoholysis catalysts for both oil and ester wax, I prefer to use sodium hydroxide, litharge or boric acid. Other substances known to be useful in promoting alcoholysis may, however, be used and in this connection there may be mentioned potassium hydroxide, lime, barium hydroxide, lead glyceride and glycolide, glycerides of alkaline earth metals, and salts of boric acid.

Variations in my exact methods will occur to those skilled in the art. As previously mentioned, I may vary the order of reacting the ingredients by adding modifying agents in addition to the ester wax (monobasic acids, monohydric alcohols, natural resins, ester gums) in the alcoholysis stage or the esterification stage or both; the entire quantity of the polyhydric alcohol may be employed for the alcoholysis of the ester wax, or a portion may be reserved for addition during the esterification step or for the separate alcoholysis of a fatty oil, or for both. Apparatus of the usual design and construction is suitable, aluminum vessels carrying an air-cooled reflux condenser being preferred. The esterification step may be carried out if desired in the presence of a solvent for the resin which is non-reactive toward the resin and the ingredients therefor, provision being had for the removal of the water of reaction; this is described in detail in a co-pending application by M. M. Brubaker (Serial No. 421,585, filed January 17, 1930).

My new resins are valuable for the production of protective coatings in general, including varnishes, lacquers, enamels, sanding lacquers and insulating varnishes.

An easy sanding lacquer can be made as follows:

Example IV

To 28.8 parts of a 50% toluol solution of the resin of Example I is added 34.3 parts 0.5 seconds viscosity nitrocellulose, 4.3 parts of zinc stearate solution, and 112.5 parts of a thinner mixture composed of ester and aromatic hydrocarbon solvents. This lacquer dries rapidly and hard, and lends itself readily to sanding, without gumming the pores of the sandpaper, and forming a very smooth lustrous surface, capable of taking a high polish.

Resins made according to this new process can be used with cellulose derivatives such as the acetate, butyrate, etc., cellulose ethers such as the ethyl, benzyl, crotyl, etc. ethers; resins such as Congo, dammar, Kauri; oils such as linseed, China-wood, etc.; bitumens such as asphalt; by dissolving in appropriate solvents to produce valuable new coating and impregnating compositions.

Example V

The resin of Example II is dissolved in acetone and used to impregnate porous paper. The impregnated paper after drying is tough and difficult to tear, and highly resistant to water.

Example VI

A molding composition is made by thinning the resin of Example III to 50% solids with benzol and adding wood flour. This is mixed thoroughly until uniform in a Werner-Pfleiderer mixer, the solvent being removed by passing steam through the outer jacket of the mixer. The mixture thus obtained is molded into disks by the application of heat and pressure.

I have found that the resins of the present invention are useful for the manufacture of valuable new synthetic varnish gums for insulating purposes. Thus, a montan wax-rosin modified polyhydric alcohol-polybasic acid resin, if heated above 260° C. for a short time with linseed oil, forms a homogeneous mixture. A solution of this product in common solvents such as mineral thinner or Hi-flash naphtha can be used as a varnish.

It will be apparent that driers, pigments, plasticizers, antioxidants, anti-bodying agents, and fillers of all description may be used in the coating compositions made from my new resins and that the films may be air-dried or baked and applied by any of the known methods of application for protective coatings.

The ester wax modified resins disclosed herein are also useful as binders, cements, adhesives and inner layers for safety glass, waxes and polishes.

As many apparently widely different embodiments of this invention may be made without departing from the spirit and scope thereof, it is to be understood that I do not limit myself to the specific embodiments thereof except as defined in the following claims.

I claim:

1. A process which comprises heating an ester wax with glycerol in the presence of an alcoholysis catalyst and heating the alcoholized wax with phthalic anhydride until resinification takes place, said ester wax being selected from the group consisting of spermaceti, carnauba wax, beeswax and montan wax.

2. A process which comprises heating an ester wax with glycerol in the presence of an alcoholysis catalyst at a temperature within the range of 235° C. to 250° C. for 1 to 4 hours and heating the product with phthalic anhydride 2 to 10 hours at a temperature of from 200° C. to 250° C., said ester wax comprising a fatty acid ester of a monohydric alcohol.

3. A process which comprises heating an ester wax with a polyhydric alcohol in the presence of an alcoholysis catalyst and heating the alcoholized wax with a polybasic acid until resinification takes place, said ester wax being selected from the group consisting of spermaceti, carnauba wax, beeswax, and montan wax.

4. The process set forth in claim 3 in which the polyhydric alcohol is glycerol.

5. The process set forth in claim 3 in which the polybasic acid is phthalic anhydride.

6. A composition of matter comprising a resinous reaction product of a polyhydric alcohol, a polybasic acid, an ester wax, and an alcoholysis catalyst, said ester wax being selected from the group consisting of spermaceti, carnauba wax, beeswax, and montan wax.

7. The composition set forth in claim 6 in which the polyhydric alcohol is glycerol.

8. The composition set forth in claim 6 in which the polybasic acid is phthalic anhydride.

9. The composition set forth in claim 6 in which the polyhydric alcohol is glycerol and the polybasic acid is phthalic anhydride.

ERNEST A. RODMAN.